(12) United States Patent
Cho et al.

(10) Patent No.: US 6,628,201 B2
(45) Date of Patent: Sep. 30, 2003

(54) RADIATION MEASUREMENT ALARM SYSTEM

(75) Inventors: Chung Nam Cho, Kashiwa (JP); Shinobu Shikano, Tokyo (JP)

(73) Assignee: Chung Nam Cho, Chiba-ken (JP)

( * ) Notice: Subject to any disclaimer, the term of this patent is extended or adjusted under 35 U.S.C. 154(b) by 0 days.

(21) Appl. No.: 10/032,788

(22) Filed: Dec. 26, 2001

(65) Prior Publication Data

US 2002/0125999 A1 Sep. 12, 2002

(30) Foreign Application Priority Data

Mar. 3, 2000 (JP) ......................................... 2000-86032

(51) Int. Cl.[7] ............................................. G08B 17/12
(52) U.S. Cl. ............... 340/600; 340/539.29; 250/336.1; 250/484.5
(58) Field of Search ............................. 340/600, 691.1, 340/691.6, 573.1, 539.11, 539.22, 539.26, 539.29; 250/286, 336.1, 388, 484.5; 368/10, 11; 342/74, 359

(56) References Cited

U.S. PATENT DOCUMENTS

| | | | | |
|---|---|---|---|---|
| 4,695,730 A | * | 9/1987 | Noda et al. ................. 250/370 |
| 4,733,383 A | * | 3/1988 | Waterbury ................... 368/10 |
| 5,168,265 A | * | 12/1992 | Aslan ......................... 340/600 |
| 5,173,609 A | * | 12/1992 | Lacoste et al. ........ 250/370.07 |
| 5,500,532 A | * | 3/1996 | Kozicki ....................... 250/372 |
| 5,567,943 A | * | 10/1996 | Plevinsky ................... 250/368 |
| 5,576,696 A | * | 11/1996 | Adler ......................... 340/600 |
| 6,031,454 A | * | 2/2000 | Lovejoy et al. ........ 340/539.11 |

* cited by examiner

*Primary Examiner*—Taon Ngoc Pham
(74) *Attorney, Agent, or Firm*—Darby & Darby

(57) ABSTRACT

A combination of a master machine and a plurality of slave machines communicate wireless with each other. In case of a radiation leak accident, multitudes of inhabitants or workers dealing with the accident are made to carry the slave machines. The slave machine measure the degree of radiation exposure in real time, and notifies this measured result automatically to the master machine by wireless communication. The master machine recognizes the accurate radiation dose of the exposure and determines the degree of danger. The master machine notifies in real time the determined result individually to people carrying the slave machine, who are exposed victims or people that have a possibility of being exposed, according to the danger degree. The master machine is made to extract true radiation measurement data from the measurement signal data sent by the slave machine, by discriminating noise. This true radiation measurement data is made to be compared to a previously prescribed safety standard data, and the danger degree is determined. An alarm signal is made so that it can be transmitted to the slave machine, according to the determined result.

14 Claims, 8 Drawing Sheets

Principal of Communicating Individually with Plural Slave
Machines Within a Specified Range Principal f Determining the Location of a Specified
Slave Machine with a Single Master Machine An Output Waveform of a Radiation Detector Normal Waveform of
Radiation detector # of Peaks
Convex:1, Concave:0
Area Ratio -0.85

Waveform of
Vibration Noise # of Peaks
Convex:6, Concave:5
Area Ratio -0.3

An Output Waveform Example II of a Radiation Detector

Normal Wave Form

Fractal Dimension
1.01

Waveform Superimposed with Noise

Fractal Dimension
1.27

An Output Waveform Example III of a Radiation Detector

Waveform in
Normal Temperature

Distortion
Factor 0.9

Waveform in
High Temperature

Distortion
Factor 1.43

RADIATION MEASUREMENT ALARM SYSTEM

BACKGROUND OF THE INVENTION

1. Technical Field

The present invention relates to a radiation measurement alarm system having a combination of a master machine and a plurality of slave machines which communicate wirelessly to each other. The present invention provides a social system that enables, in case of a radiation leak accident, multitudes of inhabitants or workers dealing with the accident carry the slave machines. The slave machines measure the amount of radiation exposure in real time, and send this measured result automatically to the master machine by wireless communication. The master machine recognizes the accurate radiation dose of the exposure, determines the degree of danger, and notifies the determined result in real time individually, to people carrying the slave machine who are the exposed victims, or people that are feared of being exposed, according to the danger degree.

2. Background Art

In recent years, there have been accidents of radiation leaks in nuclear facilities all over the world, such as nuclear power plants, related nuclear fuel manufacturing facilities, and radioactive waste disposal facilities. Local inhabitants have been exposed to radiation because of these accidents. Countermeasures have been taken, such as evacuation to minimize exposure, and working or getting medical treatment while being measured of the amount of exposure. The existence of these nuclear energy utilization facilities can be accepted, essentially only when safety is mortgaged. Therefore, it is often explained by the facility administering side that it is absolutely safe, because the most thorough-going radiation leak countermeasure thinkable has been taken at all times. But, in reality, there have often been radiation leak accidents, and exposure damages have occurred among the inhabitants and concerned people. In other words, the safety myth has crumbled, and there is feeling that human ability has a limit. Furthermore, since absolute safety is an assumption, there have been almost no radiation measurement alarm system presented that is effective for inhabitants dealing with the unlikely event of an accident.

There have been numerous radiation measuring instruments and radiation measurement systems developed or presented, such as Japanese Patent Laid Open Publication No. Hei. 10 197645, Japanese Patent Laid Open Publication No. Hei. 08 82681, Japanese Patent Laid Open Publication No. Hei. 10 10234, Japanese Patent Laid Open Publication No. Hei. 08 334563, and so on. All of these systems, however, are either a method to accurately measure the radiation used by concerned people within a specified facility, or a system that provides a specified observation point, and acquiring and visualizing automatically the radiation distributed circumstances.

In the above-mentioned Japanese Patent Laid Open Publication No. Hei. 10 197645 there is provided a radiation measuring instrument in which the changing of the probe is easy and simple, thereby minimizing fear of mis configuration. This radiation measuring instrument is used by selecting a probe from among pluralities of probes, and by connecting it to a common measurement part through a connection part. The shape of this connection part that connects the probe and the measurement part is common, and there is also probe type notifying means that automatically notifies the measurement part, which probe type was connected to the connection part.

Those systems disclosed in the above-mentioned Japanese Patent Laid Open Publication No. Hei. 08 82681 are aimed at reducing only the effects of the surge noise, without changing the monitor function caused by the surge noise. In the case of measuring radiation by counting pulses after a wave height discrimination has been conducted for the signal pulses generated in the radiation measuring instrument, a wave height discrimination is conducted on the positive pole side and the negative pole side of the signal coming from the radiation measuring instrument. When a negative pole side signal is detected in this wave height discrimination, a dead time is set for prohibiting detection of signals from the radiation detector, for a prescribed duration of time succeeding the detection.

Those systems disclosed in the above-mentioned Japanese Patent Laid Open Publication No. Hei. 08 334563 enables, in an emergency, the automatic acquisition of the distributed circumstances of radiation that changes every minute, in real time as is possible, and as visualized information. This acquisition system is aimed at reducing time, improving efficiency, increasing the accuracy of the information, and reducing the radiation exposure to the person in charge of the measurement.

As means for achieving the above-mentioned object, the system is composed of multitudes of mobile slave stations, measuring the radiation dose at the measuring site, and a master station, processing data at a location far and remote from the slave stations. Preferably, at least twenty to thirty slave stations are installed. Each of these slave stations has a GPS location measurement instrument that detects the installed location, a radiation measuring instrument that measures the radiation dose at prescribed intervals, and a data transmitting apparatus that transmits the detected location data and the radiation dose data to the master station with wireless communication. The master station has a data receiving apparatus that receives the location data and the radiation dose data from each of the slave stations. The master station also has a data processing apparatus that immediately makes a database out of the reception data. The master station also has a contour map of the radiation dose rate drawn in real time, making a monitor image of the radiation dose rate map of the measured area, by overlaying the contour map on the geographic information system.

In the above-mentioned Japanese Patent Laid Open Publication No. Hei. 10 10234, a spatial radiation dose equivalent rate and a concentration of surface contamination are measured for workplaces where radioactive material exist, such as a nuclear power plant. Location information is also acquired with signals from plural wireless transmitters.

As means for achieving the above-mentioned object, wireless transmitters are placed at plural locations inside a radiation operation area where radiation is handled. A transportable radioactivity measuring instrument, carried by the radiation operators, receives the radio waves transmitted from these plural wireless transmitters. Information of the location inside the area is acquired by data processing, and radiation measurement is also conducted.

As mentioned above, conventional radiation measuring instruments and radiation measurement systems merely are methods to measure radiation within a specified facility, or merely visualize the distributed circumstances of radiation with the provision of specified observation points. There has been no system or technical philosophy whatsoever, that measured, in real time, the amount of radiation exposure to inhabitants, who consist of an unspecified number of the general public, scattered around a broad area, freely moving about. Furthermore, there has been no system or technical philosophy whatsoever that determined immediately the danger degree of the radiation exposure, giving alarms of the danger degree of the radiation exposure to those inhabitants in real time.

Taking the accident that really occurred at Tokai mura (village), for instance, there were only evacuation recommendations and curfew warnings issued to inhabitants within a specified area. As to how much radiation each of the inhabitants were exposed to, there were only countermeasures later on, with measurements and notification of whether or not the result was within the tolerance range of safety. Hence, anxiety and dissatisfaction of the inhabitants hse not been wiped off. In the unlikely event of a radiation leak accident happening, it is wished that the inhabitants who have fear of having been exposed to the radiation could at least measure the amount of exposure in real time, with measuring instruments carried individually, and that the inhabitants could at least be notified immediately of the danger degree, with alarms to each of them. The present invention was researched and developed, to give an answer to these wishes of the inhabitants.

A radiation leak accident cannot be recognized by the five senses of human beings. Therefore, a system is required to be capable of sensing, in real time, the amount of radiation exposure to the inhabitants, who consist of an unspecified number of the general public scattered by moving about, and to be capable of measuring the amount of radiation exposure, and capable of giving alarms of the danger of the radiation exposure to those inhabitants. In order to fulfill such requirements, the following pending problems must be solved: that is, the measuring instrument that can measure the radiation has to be compact in form, so that any one of the inhabitants can carry it easily, and so that it does not limit the living activity of the inhabitants. Measurement values can be made accurate at all times by removing noise, because noise is apt to be mixed into the radiation measurement value. The decision of the danger degree from the measurement result needs to be done by experts accurately. The decision result of the danger degree has to be made into an individual alarm that can notify the individual slave machines that individually measured the radiation.

Furthermore, in relation to radiation measuring sensors, it is known that alpha rays can be measured by semiconductor type sensors, such as the photo diode type. Beta rays can be measured by plastic scintillation type sensors. Gamma rays can also be measured by the semiconductor type sensors. Although there is a possibility of these sensors becoming compact, it is very difficult to recognize the measurement value of the true radiation dose according to the radiation type, because the probes for measuring the alpha rays, beta rays, and gamma rays are all different. Furthermore, noise is mixed into the measurement value. Even when true radiation dose according to the radiation type has been recognized, the decision of the danger degree is difficult for people who are not experts. Furthermore, when there has been a radiation exposure, it is difficult to measure the amount of exposure in real time, and moreover, it is difficult to notify in real time the danger of being exposed, with alarms or the like.

OBJECTS AND SUMMARY OF THE INVENTION

It is an object of the present invention to provide a radiation measurement alarm system which solves the foregoing problems.

It is a further object of the present invention to provide a radiation measurement alarm system which minimizes the exposure damage caused by radiation leak accidents.

It is another object of the present invention to provide a radiation measurement alarm system which reduces the anxiety of the inhabitants as soon as possible.

Briefly stated, the present invention provides a combination of a master machine and a plurality of slave machines which communicate wirelessly with each other. In case of a radiation leak accident, multitudes of inhabitants or workers dealing with the accident are made to carry the slave machines. The slave machine measure the degree of radiation exposure in real time, and notifies this measured result automatically to the master machine by wireless communication. The master machine recognizes the accurate radiation dose of the exposure and determines the degree of danger. The master machine notifies in real time the determined result individually to people carrying the slave machine, who are exposed victims or people that have a possibility of being exposed, according to the danger degree. The master machine is made to extract true radiation measurement data from the measurement signal data sent by the slave machine, by discriminating noise. This true radiation measurement data is made to be compared to a previously prescribed safety standard data, and the danger degree is determined. An alarm signal is made so that it can be transmitted to the slave machine, according to the determined result.

The present invention intends to resolve such problems as mentioned above, and is constituted in the following way.

The first aspect of the present invention is a radiation measurement alarm system related to a combination of a master machine and a plurality of slave machines that can communicate with each other in wireless mode.

The slave machine comprises a radiation detecting part, composed of a sensor that detects a radiation and transforms the detection to an electric measurement signal, and a preamplifier that amplifies the measurement signal from the sensor. A slave machine transmitting apparatus is composed of a slave machine transmitting part that transmits high frequency wave with a surface wave transmitter and a transistor, a slave machine modulating part that modulates the measured signal data to high frequency wave, and a transmission pattern antenna part. The slave machine transmitting apparatus is made to transmit the sending data with high frequency wave transmission. A slave machine receiving apparatus is composed of a reception pattern antenna part, a reception high frequency preamplifier part, and a slave machine demodulating part that demodulates the high frequency wave into reception data. The slave machine receiving apparatus is made so that it can receive high frequency waves from the master machine, and demodulate it into reception data. An alarm apparatus is composed of an emergency transmitting switch that transmits an emergency radio wave continuously when this switch is pushed in emergency, and an alarm display part that notifies the possessor of the slave machine with sound and illumination that it is being exposed to radiation, on receiving an alarm signal from the master machine. A slave machine control part is composed of command interpretation means that interprets command sent from the master machine, command responding means that corresponds to the command, ID management means, and time management means.

The slave machine is made to transform a detection into electric measurement signal data, and transmit the measurement signal data from the transmitting apparatus, when radiation is detected by the sensor. The slave machine is also made capable of sending and receiving electric signal data to and from the master machine, so that it can display a danger alarm or a safety notice on the alarm apparatus, on receiving an alarm signal from the master machine.

The aforementioned master machine is constituted by a transmitting apparatus, a receiving apparatus, a data processing part, a master machine control part, and output means.

The transmitting apparatus is composed of a transmitting part that transmits a high frequency wave with a surface wave transmitter and a transistor, a modulating part that modulates the sending data into high frequency wave, a variable gain amplifier part that can control the output of the radio wave outputted from a transmission antenna part, and the transmission antenna part, and is made so that it can transmit the sending data with high frequency wave.

The receiving apparatus is composed of a reception antenna part provided with both a non-directional receiving antenna and a directional receiving antenna, an antenna switching part that can switch over between the non-directional receiving antenna and the directional receiving antenna, a reception preamplifier part, and a demodulating part that demodulates high frequency wave signals into reception data. The receiving apparatus is made so that it can receive high frequency wave signals from the plural slave machines, and demodulate the wave signals into reception data.

The data processing part is composed of database means that receives the measured data sent from the slave machine with the aforementioned receiving apparatus, and registers and stores this measured signal data. A noise discrimination apparatus takes out the measurement signal data from the database means, analyzes the measurement signal data to extract and transform the data into true radiation measurement data by distinguishing and removing noise signals, and stores this true radiation measurement data. A danger degree determining means takes out the true radiation measurement data, and compares this to a previously prescribed safety standard data to determine the danger degree, and which instructs countermeasures. An alarm signal transmitting means has alarm signals transmitted from the transmitting apparatus to the slave machine, according to the determined result of the danger degree determining means.

The master machine control part is composed of a gain control means that enables a gain control of the variable gain amplifier part. A distance measuring means specifies the range the radio wave can reach using the above-mentioned gain control means, and enables the measurement of this distance. A direction specifying means specifies the direction of the radio wave, by using the directional antenna. A reserved time configuration means configures the reserved time, from the master machine to the slave machine. A command transmitting means enables the transmission of necessary commands as data. A response signal receiving means receives response signals from slave machines corresponding to transmission from the master machine. An ID recognizing means specifies the slave machine transmitting the received signal, by recognizing the ID added beforehand to the signal.

The output means part is made to output contents of processing in the data processing part and the master machine control part, such as the range and distance that the radio wave can reach, the specified direction that the radio wave is to reach, the results of specifying the slave machines transmitting signals, the measurement signal data from the slave machine, the true radiation measurement data extracted from the measurement signal data, the result of determining the danger degree of the true radiation measurement data, and the contents of alarms sent to the slave machines.

This radiation measurement alarm system is characterized by the following. The master machine is made to communicate with plural slave machines by high frequency wireless communication, to store the measurement signal data sent from the slave machines, and extract true radiation measurement data from this measurement signal data by discriminating noise. This true radiation measurement data is compared to a previously prescribed safety standard data to determine the danger degree, and an alarm signal is transmitted to the slave machines according to the determined result. Moreover, the master machine is made to recognize and specify the locations or numbers of plural slave machines, or to recognize the person possessing the slave machine, using the ID recognizing means, to specify the location of the slave machine, with the direction and distance of the slave machine in relation to the base location of the master machine, using the direction specifying means and the distance measuring means both of which receive the radio wave by switching over between the non-directional receiving antenna and the directional receiving antenna, to transmit commands or other signals to the slave machine, and to receive response signals from the slave machines. The slave machine is made so that it can transmit an emergency radio wave in emergency.

The first aspect of the present invention has the master machine placed at the center of a specified range that a radio wave can reach. The master machine transmits call-out sending data to the slave machines with high frequency wave. The transmitting means sending out the call-out radio wave, uses broadcasting or polling methods. A name, identification (ID) number, or the like, of the person possessing the slave machine is added onto the slave machine beforehand as an ID, and this ID is stored in the master machine also. The slave machines respond according to the ID, after a prescribed time interval with the broadcasting method, and when called upon with the polling method. The master machine determines that the slave machine is located within the specified range area when it receives a high frequency response from the slave machine, and outputs the result through the output means part of the master machine. Since the specified range that a radio wave is able to reach can be made variable, it is possible to configure an intended sending receiving range and transmit sending data with high frequency wave, and check the number and names of persons possessing the slave machine located within that range area, immediately. Although the master machine has only one transmitter, it can transmit plural sets of call-out signals because the slave machines have ID's, and it is possible to differentiate and grasp easily the members of each group, from a mixture of members of plural groups. Such communication function to communicate with individuals with wireless communication, is one of the base features of the present invention.

Furthermore, the first aspect of the present invention has the emergency transmitting switch provided in the slave machine as an alarm apparatus, which transmits an emergency radio wave from the slave machine whenever this switch is pushed in emergency. Hence it is possible to find out the location of the possessor of the slave machine easily, by specifying the direction and distance of the slave machine immediately.

Aside from these basic functions, the first aspect of the present invention is characterized in that it is provided with the following various functions, at the same time. One of the functions is a provision of the antenna switching part in the master machine, making it possible to switch over freely between the non-directional receiving antenna and the directional receiving antenna. Hence it is possible, for example, to first measure the distance that the radio wave can be transmitted using the non-directional receiving antenna, then to specify the direction with the directional receiving antenna, and after that, to find out easily the location of the person possessing the slave machine, using both of these information.

Also the first aspect of the present invention is made such that the master machine is further provided with a variable gain amplifier part that controls the output of the radio wave outputted from the transmission antenna part. This variable gain amplifier part adjusts the sending-receiving level of the radio wave from the master machine, so that it reaches only within an interior of a room with no leaks to the exterior, or only within a specified range area. Therefore, it is possible to check the number of persons within a specified room, or within a prescribed area.

The second aspect of the present invention is the radiation measurement alarm system according to the first aspect of the present invention, which is characterized in specifying and ascertaining the number of slave machines within a specified range area, and in the identification of the slave machine from the ID. This is conducted in the following steps. First, the gain amplifier part of the transmitting apparatus of the master machine is made a variable gain amplifier part, which can control and vary the output of the radio wave outputted from the transmission antenna part. Then the gain control of the variable gain amplifier part is used to specify the range or distance a radio wave can reach, and the distance is measured. Call-out signals are transmitted to the slave machines within the specified range that the master machine can send and receive radio waves. Signals are received from the slave machines that have received the call-out signals from the master machines.

The second aspect of the present invention is characterized by being able to do the following. In the radiation measurement alarm system of a wireless communication method, the variable gain amplifier part is mounted on the master machine, which can vary the specific range area that the radio wave can reach, and communication is done with the slave machines within the range area, while changing the sending and receiving range. When the communication is accomplished, the possessor or the mounted place of the slave machine is specified, so that it is possible to make certain that the person is located within a prescribed range area.

The third aspect of the present invention is the radiation measurement alarm system according to the first aspect of the present invention, which is characterized in that the reception antenna part of the receiving apparatus of the master machine is provided with both a non-directional receiving antenna and a directional receiving antenna, and these non-directional receiving antenna and directional receiving antenna can be switched over by the antenna switching part of the receiving apparatus. Using these antennas, the direction of the radio wave can be made omni directional, or limited to a specified direction. The transmission distance is measured by using the non-directional receiving antenna, and after that, it is switched over to the directional receiving antenna by the antenna switching part, to specify the direction. Then the location of the person possessing the slave machine is checked by the master machine.

The third aspect of the present invention is characterized in that the antenna switching part is provided in the receiving apparatus of the master machine. This makes it possible to switch over freely between the non-directional receiving antenna and the directional receiving antenna. Thus, it is possible, for example, to first measure the distance that the radio wave can be transmitted to, with the non-directional receiving antenna, then to specify the direction with the directional receiving antenna, and then find out easily the location of the person possessing the slave machine, using both of these information by the master machine.

The fourth aspect of the present invention is the radiation measurement alarm system according to the first aspect of the present invention, which is characterized by having relaying means interposed, for relaying radio waves, in making the master machine and the slave machines communicate wireless with each other.

The above, and other objects, features and advantages of the present invention will become apparent from the following description read in conjunction with the accompanying drawings, in which like reference numerals designate the same elements.

DETAILED DESCRIPTION OF THE INVENTION

Figure 1:
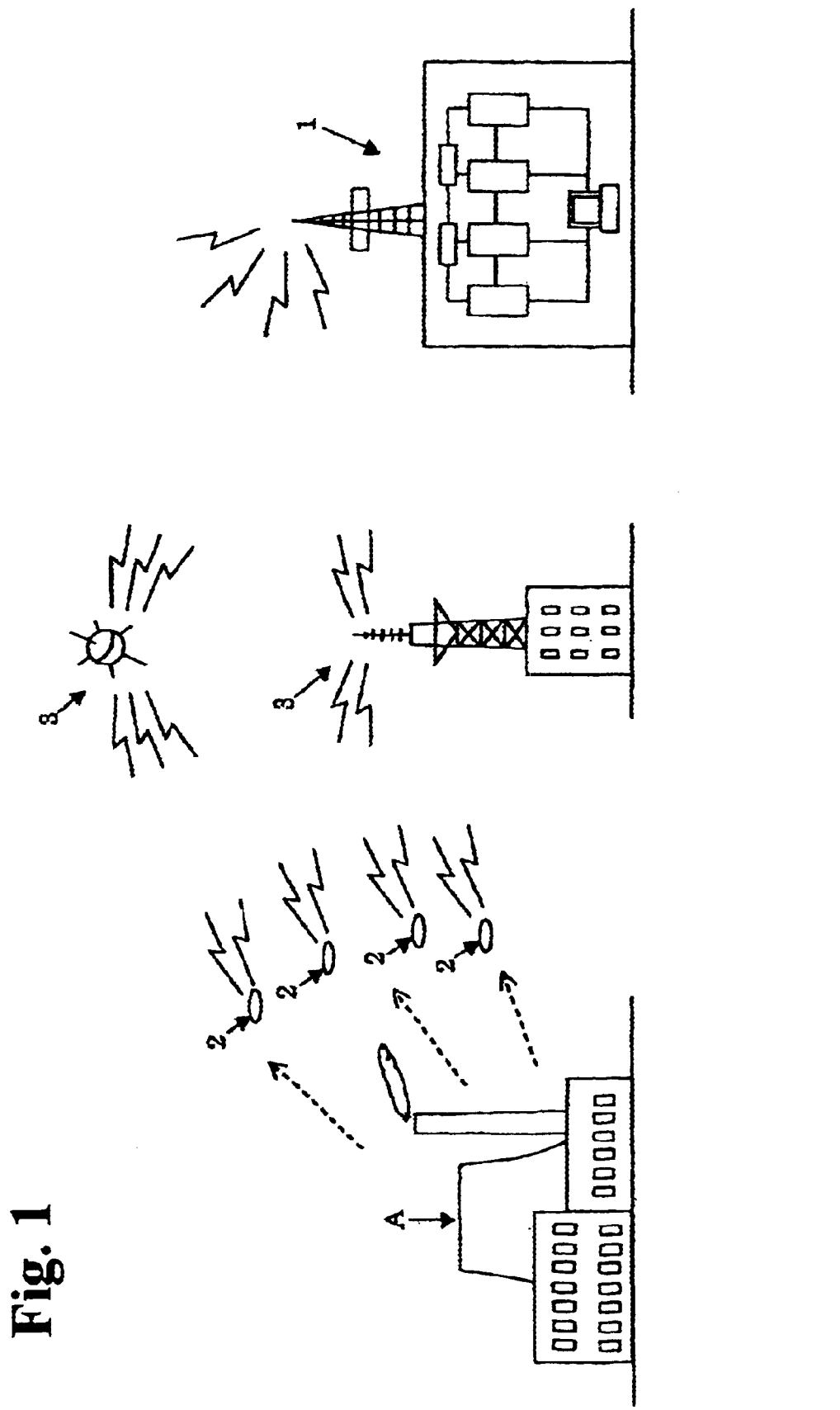
FIG. 1 is an explanatory diagram showing the whole of a radiation measurement alarm system according to the present invention, in use.
Figure 2:
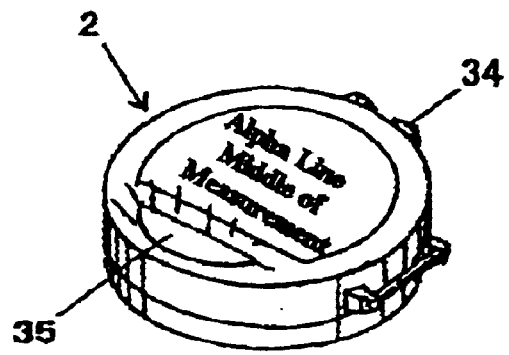
FIG. 2 is a perspective view showing an embodiment of a slave machine constituting the present invention.
Figure 3:
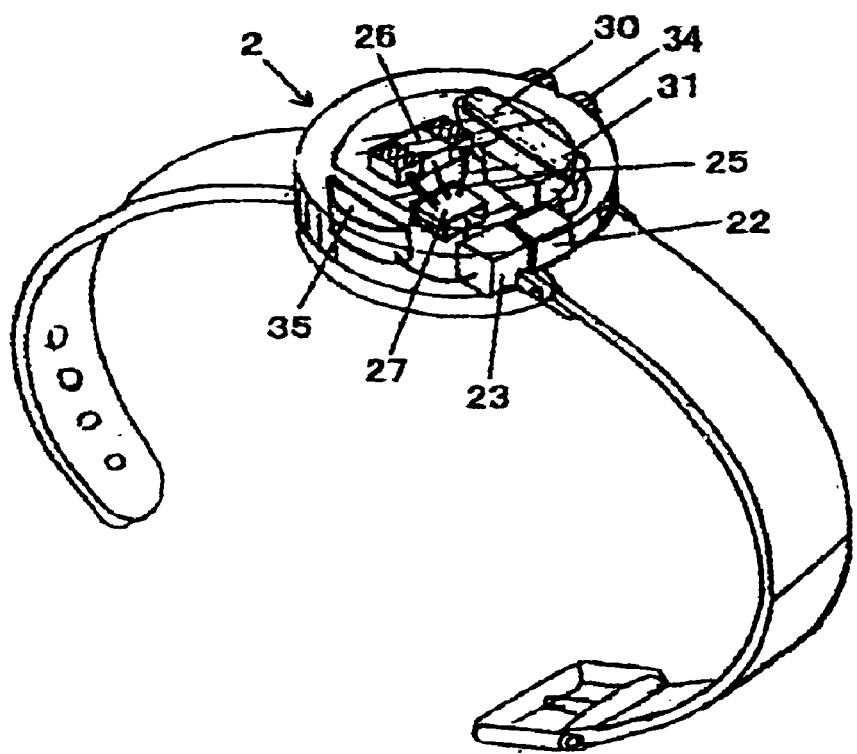
FIG. 3 is a perspective view showing a construction of a wristwatch type embodiment of the slave machine constituting the present invention.
Figure 4:
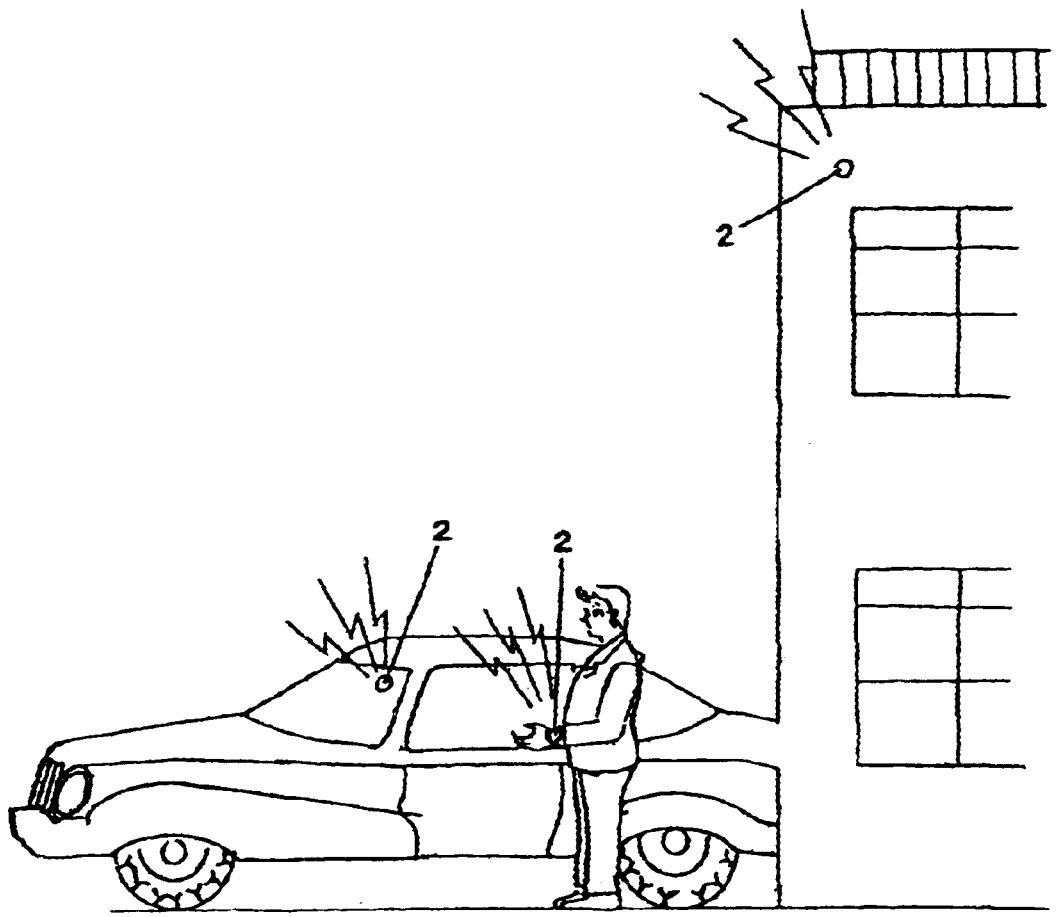
FIG. 4 is a perspective view showing a specific mounting example of the slave machine constituting the present invention.
Figure 5:
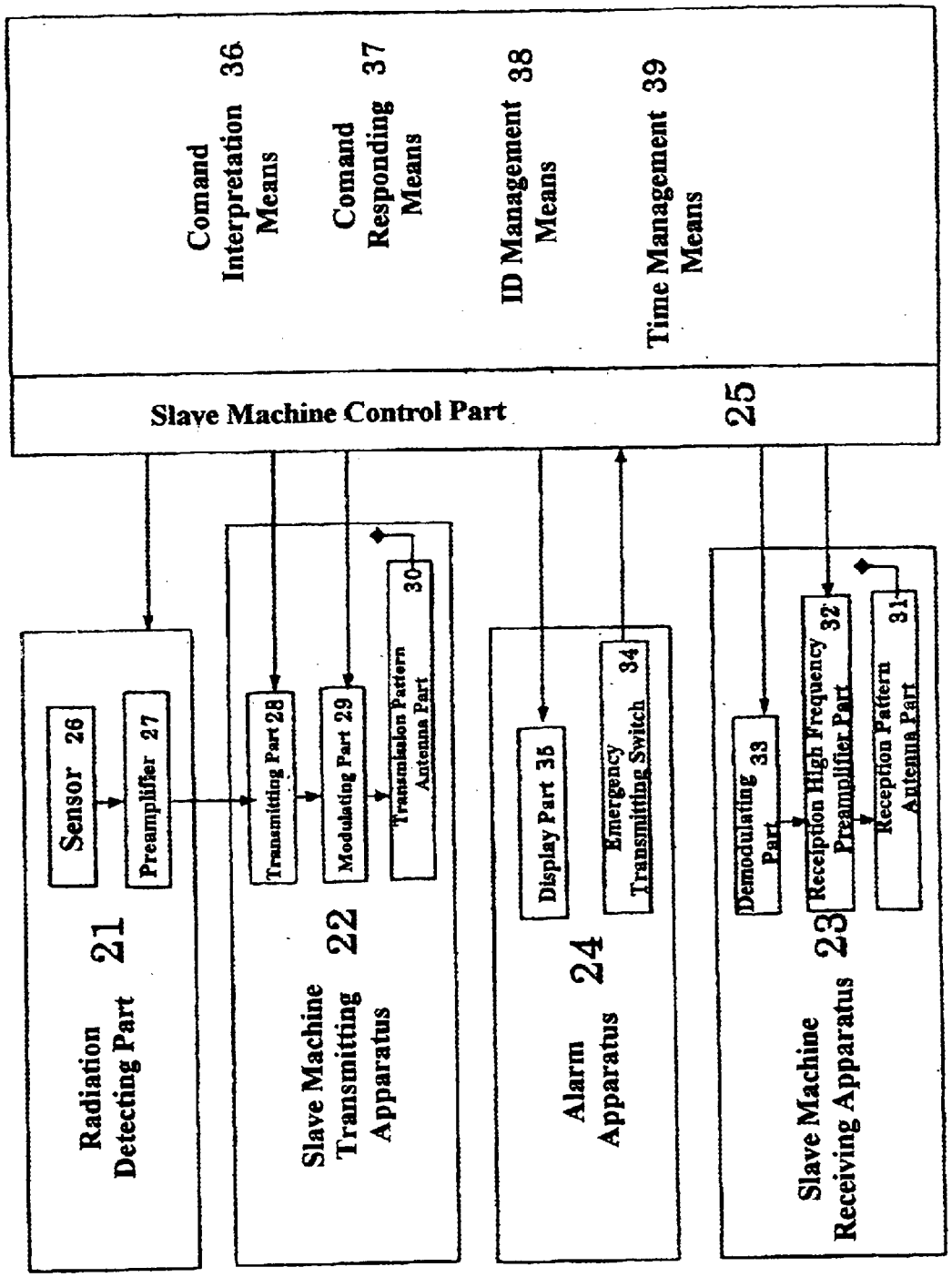
FIG. 5 is a block diagram showing the constitution of a slave machine of the radiation measurement alarm system according to the present invention.

An embodiment of a radiation measurement alarm system according to the present invention will be described in the following.

Referring to FIGS. 1 to 4, a radiation measurement alarm system according to the present invention is a combination of a master machine 1 and a plurality of slave machines 2 which communicate with each other. A relaying means 3 is provided, when necessary, to assist in the communications between master machine 1 and slave machines 2. In the combination of the plurality of slave machines 2 with single master machine 1, it is preferred that slave machines 2, with numbers in the vicinity of ten thousands or twenty thousands, corresponding to the number of inhabitants living near a nuclear energy utilization facility "A", for example, are administered per one master machine 1. The persons measuring the radiation are the inhabitants, and should be prepared to measure the radiation, by carrying slave machine 2 as, for example, a wristwatch, by mounting slave machine 2 on a building, or by adhering slave machine 2 on an automobile. There are individual ID (identification) information, such as names or identification numbers, inputted in addition to these slave machines 2. This ID information is also inputted into master machine 1 in a similar way. It should be noted that, in this case, ID information may be inputted into slave machines 2 per group unit.

Referring to FIGS. 2 to 5, slave machine 2 is provided with a radiation detecting part 21, a slave machine transmitting apparatus 22, a slave machine receiving apparatus 23, an alarm apparatus 24, and a slave machine control part 25. A specific slave machine 2 in the embodiment shown in the drawings, is made compact into a wristwatch shape to be worn around the wrist with a band (see FIG. 3), and becomes a medal type of disc shape when a band is not mounted (see FIG. 2). It is also possible to have embodiments of slave machine 2, in which slave machine 2 is mounted on a building or an automobile that has possibilities of being exposed to radiation. Slave machine 2 includes a sensor 26 that detects radiation, a preamplifier 27, an alarm display part 35, an emergency transmitting switch 24, and a transmission pattern antenna part 30, which doubles as a reception pattern antenna part.

The constituting parts of the slave machine will now be described in detail. Radiation detecting part 21 is composed of sensor 26 that detects a radiation and transforms the detection into an electric measurement signal, and preamplifier 27 that amplifies the measurement signal from sensor 26. In this embodiment, a photo diode is used for sensor 26. Since a commercially available photo diode is about ten mm square, slave machine 2 can be made sufficiently compact to a size as small as about 30 mm in diameter of circular watch form. Needless to say, sensor 26 is not limited to being a photo diode. Pluralities of sensors can be combined according to the kind of radiation they can measure, such as semiconductor types for alpha rays, plastic scintillation types for beta rays, and semiconductor types for gamma rays, for example. In this case, it is necessary to constitute the radiation detecting part to change or switch over the bias voltage, in order to measure each of the alpha rays, beta rays, and gamma rays.

Slave machine transmitting apparatus 22 is composed of a slave machine transmitting part 28 that transmits high frequency wave with a surface wave transmitter and a transistor, a slave machine modulating part 29 that modulates the sending data to high frequency wave, and a transmission pattern antenna part 30. Slave machine transmitting apparatus 22 is made so that it can transmit the sending data with high frequency wave transmission.

Slave machine receiving apparatus 23 is composed of a reception pattern antenna part 31, a reception high frequency preamplifier part 32, and a slave machine demodulating part 33 that demodulates the high frequency wave into reception data. Slave machine receiving apparatus 23 is made so that it can receive high frequency wave from master machine 1, and demodulate it into reception data.

Alarm apparatus 24 is composed of emergency transmitting switch 34, that transmits an emergency radio wave continuously when this switch is pushed in emergency, and alarm display part 35, that notifies the possessor of the slave machine 2 with sound and illumination, when it receives an alarm signal from master machine 1.

Slave machine control part 25 is constituted by command interpretation means 36 that interprets the command sent from master machine 1 in high frequency wave transmission, command responding means 37 that corresponds to the command, ID management means 38, and time management means 39.

Slave machine 2 is composed in the above-mentioned way, and, when it detects radiation with sensor 26, slave machine 2 transforms the detection into electric measurement signal data, and transmits the measurement signal data with slave machine transmitting apparatus 22. Also slave machine 2 is made to be capable of sending and receiving electric signal data to and from master machine 1, so that it can display a danger alarm or a safety notice on alarm display part 35 of alarm apparatus 24, on receiving an alarm signal from master machine 1. The measurement signal data of slave machine 2 is raw data including noise, and has not been processed or analyzed.

Master machine 1 is provided with a transmitting apparatus 12, a receiving apparatus 13, a central processing apparatus 14 composed of a data processing part 14A and a master machine control part 14B, and output means part 15. Master machine 1 conducts a centralized control of the multitudes of slave machines 2 that the inhabitants possess. Master machine 1 is an apparatus for analyzing the transmitted radiation measurement data, determining the degree of danger, or transmitting alarms to slave machines.

Figure 6:
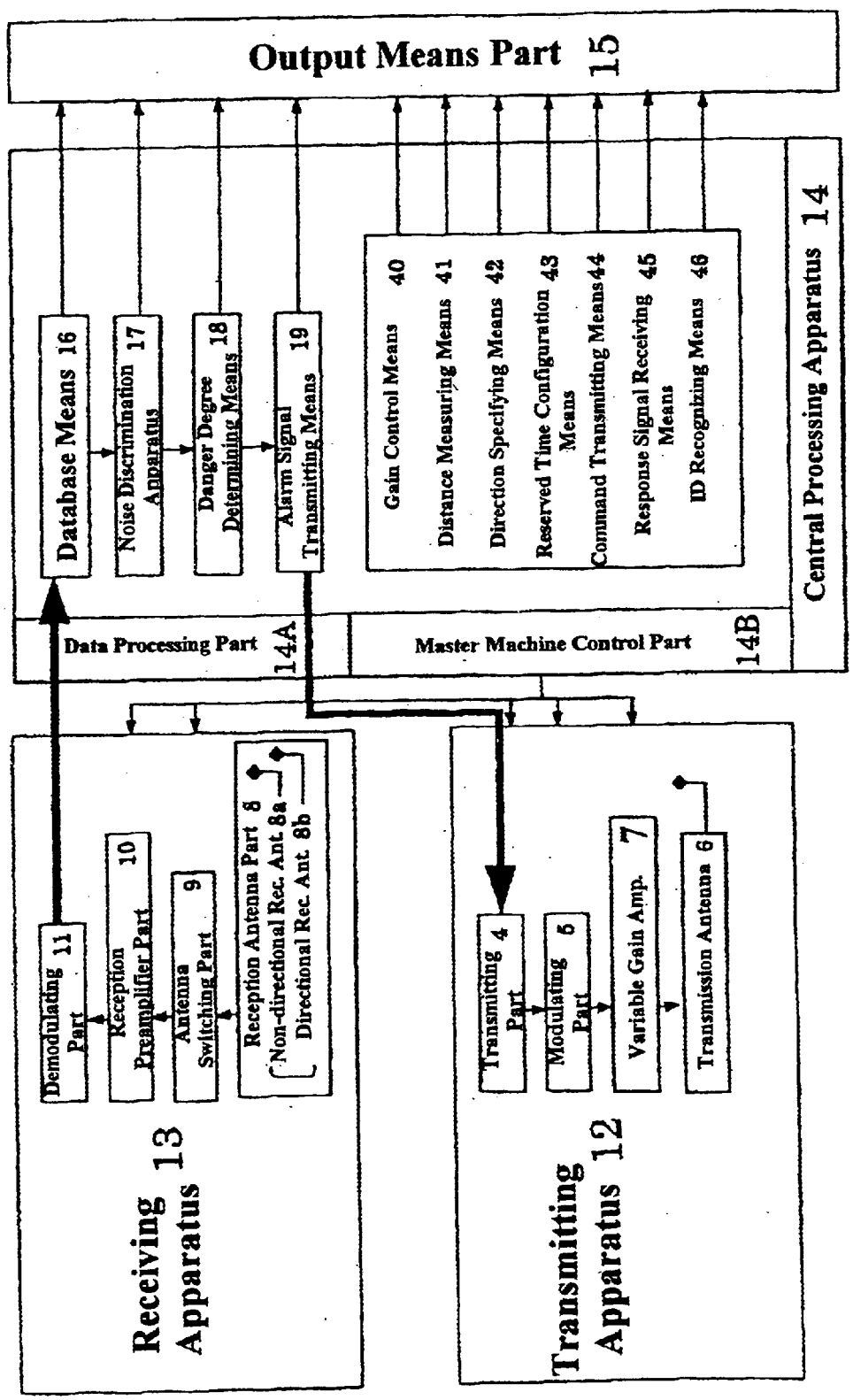
FIG. 6 is a block diagram showing the constitution of a master machine of the radiation measurement alarm system according to the present invention.

Referring to FIG. 6, master machine 1 will now be described in detail. Transmitting apparatus 12 of master machine 1 is composed of a transmitting part 4 that transmits high frequency wave with a surface wave transmitter and a transistor, a modulating part 5 that modulates the sending data into high frequency wave, a variable gain amplifier part 7 that controls the output of the radio wave outputted from a transmission antenna part 6. Transmitting apparatus 12 is made so that it can send alarm signal data, commands, or response signals with high frequency wave transmission.

Receiving apparatus 13 is composed of a reception antenna part 8 provided with both a non-directional receiving antenna 8a and a directional receiving antenna 8b, an antenna switching part 9 that can switch over between the non-directional receiving antenna 8a and the directional receiving antenna 8b, a reception preamplifier part 10, and a demodulating part 11 that demodulates the high frequency wave signal into reception data. Receiving apparatus 13 is made so that it can receive measurement signal data, commands, and response signals from plural slave machines 2 as high frequency wave signal, and demodulate it into reception data.

Central processing apparatus 14 is composed of a basic data processing function part 14A, and a master machine control function part 14B. Central processing apparatus 14 is capable of processing all the processes using a computer, but need not be limited to using the computer. In this invention, data processing part 14A is an essential constituent element for processing the measured radiation, but master machine control part 14B is an auxiliary function element installed to make operation easier, as appropriate.

Data processing part 14A is composed of database means 16, a noise discrimination apparatus 17, danger degree determining means 18, and alarm signal transmitting means 19. More specifically, data processing part 14A is composed of database means 16 that receives the measured data sent from slave machine 2 with receiving apparatus 13, and registers and stores this measured signal data in a file. Noise discrimination apparatus 17 takes out the measurement signal data from database means 16, analyzes the measurement signal data, distinguishes and removes noise signal, extracts true radiation measurement data, and measures and stores this true radiation measurement data when necessary. Danger degree determining means 18 takes out the true radiation measurement data, compares this to a previously prescribed safety standard data to determine the danger degree, and which instructs countermeasures. Alarm signal transmitting means 18 has alarm signals transmitted from transmitting apparatus 12 to slave machine 2 as appropriate, according to the determined result of danger degree determining means 18.

Figure 9A:
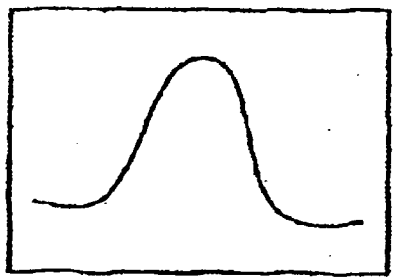
FIGS. 9A and 9B are drawings showing an example of a case in which a signal feature extracting process of a noise discrimination apparatus is applied to measured signal data, by means for discriminating noise signals with the ratio of the waveform area size and the waveform total area size.
Figure 9B:
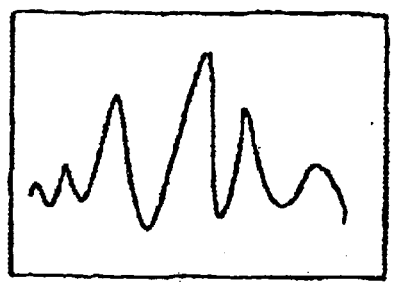
Figure 10A:
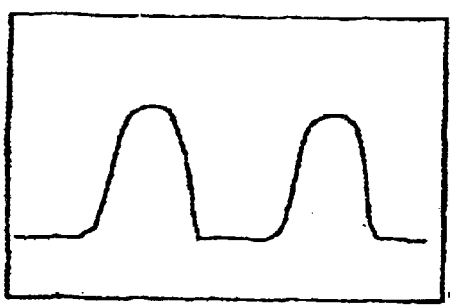
FIGS. 10A and 10B are examples of a signal feature extraction with means for discriminating noise signals by acquiring a fractal dimension from the input waveform, applied to an output signal of a radiation waveform.
Figure 10B:
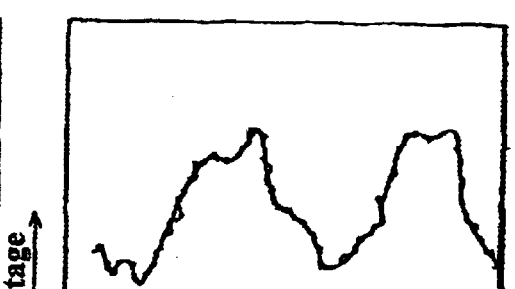
Figure 11A:
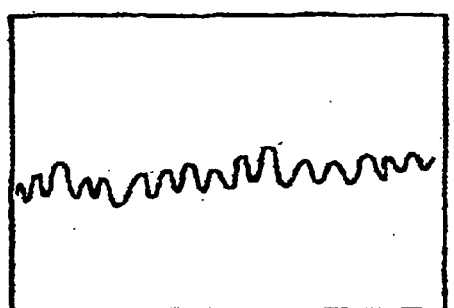
FIGS. 11A and 11B are examples of a signal feature extraction with means for discriminating by acquiring a distortion factor from the input waveform, applied to an output signal of a radiation waveform.
Figure 11B:
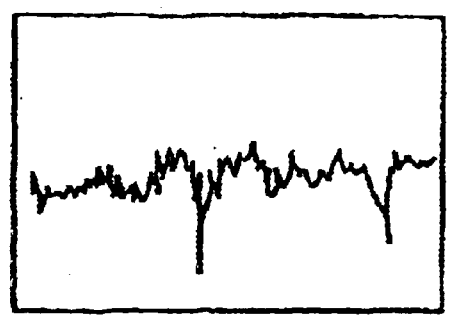

The measurement signal of the radiation is often minute, and noise can easily mix into the signal, because it has to be amplified to be recognized. This noise has to be reduced. Therefore, in the present invention, noise signal is discriminated and removed in noise discrimination apparatus 17. After the noise removal, the true radiation measurement data can be checked. There are three discriminating methods for noise discrimination apparatus 17 of this embodiment, in the case of processing with computers for example. The first method is to discriminate the noise signal and the true radiation measurement signal, in accordance with the ratio of the waveform area size corresponding to the maximum peak value of the input waveform, and the waveform total area size (FIGS. 9A and 9B). The second method is to acquire a fractal dimension from the input waveform, and then to discriminate the noise signal and the true radiation measurement signal in accordance with this fractal dimension (FIGS. 10A and 10B). The third method is to acquire a distortion factor from the input waveform, and then to discriminate the noise signal and the true radiation measurement signal in accordance with this distortion factor (FIGS. 11A and 11B). It is possible to discriminate with only one of the above methods, but it is preferred to compare noise signals and true radiation measurement signals discriminated from at least two or more of the noise discrimination means, and then to extract and specify the ultimate true radiation measurement signal. This tends to give the most reliable results.

Embodiments of the aforementioned three discrimination means will be described in the following. FIGS. 9A and 9B are drawings showing an example of a signal feature extracting process applied to measured signal data, by the first means to discriminate noise signals and the true signal using the ratio of the waveform area size and the waveform total area size. FIG. 9A indicates a normal waveform of a radiation pulse, and FIG. 9B portion indicates a waveform of a radiation pulse that has been superimposed by vibration noise due to external factors such as welding.

FIGS. 10A and 10B are examples of a signal feature extraction applied to an output signal of a radiation measurement waveform, by the second discrimination means with the acquisition of the fractal dimension from the input waveform. FIG. 10A indicates a waveform of a radiation detector in normal state, and FIG. 10B indicates a waveform that has been superimposed by noise due to external factors.

FIGS. 11A and 11B are examples of a signal feature extraction applied to an output signal of a radiation waveform, by the third means to discriminate with the acquisition of the distortion factor from the input waveform. FIG. 11A indicates an output waveform in normal temperature state, and FIG. 11B indicates an output waveform of an assumed case in which a noise is generated due to the characteristic change or the like of the detector. The distortion factor is indicated at the bottom of the graph.

More specifically, in all of the discrimination methods, measurement signal data is taken out of database means 16, and a signal feature is extracted from the signal data according to a feature extracting algorithm. Then, a decision is made whether or not the signal is a false signal by a decision process algorithm, and discrimination is done by deleting the false signal, or by registering the false signal at another place, and prohibiting the false signal from being transferred to danger degree determining means 18.

Master machine control part 14B is constituted by all or a part of the following. A gain control means 40 enables a gain control of variable gain amplifier part 7. A distance measuring means 41 specifies the range and measures the distance that a radio wave can reach, or the measurement of this distance, using gain control means 40. A direction specifying means 42 specifies the direction of the radio wave with the directional antenna. A reserved time configuration means 43 configures the reserved time, from master machine 1 to slave machine control part 25 of slave machine 2. A command transmitting means 44 enables the transmission of necessary commands as data. A response signal receiving means 45 receives response signals from slave machines corresponding to transmission from master machine 1. An ID recognizing means 46 specifies the slave machine transmitting the received signal, by recognizing the ID added beforehand to the signal.

Output means part 23 outputs the range and distance that the radio wave can reach, the specified direction that the radio wave reaches, the response signal from slave machine 2, the number of people that has been able to receive the radio wave, and the recognition and identifying result of the possessing person or the located place of slave machine 2.

The radiation measurement alarm system according to the embodiment of the present invention, as shown in the drawings, is used specifically in the following manner. First of all, a method for measuring radiation leak using the radiation measurement alarm system will be described.

When there is a radiation leak accident and slave machines 2 detect the radiation with sensor 26, the signal is transformed into electric measurement signal data, and the measurement signal data is transmitted from slave machine transmitting apparatus 22. That is, slave machine 2 conducts a high frequency wireless communication to master machine 1. Then, master machine 1 stores the measurement signal data transmitted from slave machine 2 in database means 16. Then, the measurement signal data is taken out of database means 16, and true radiation measurement data is extracted from the measurement signal data by discriminating noise. This true radiation measurement data is compared to previously prescribed safety standard data, and the danger degree is determined. After that, an alarm signal is transmitted to slave machine 2, depending on the determined result. Then, slave machine 2 displays a danger alarm or a safety notice on alarm display part 35 of alarm apparatus 24, on receiving an alarm signal from master machine 1.

It should be noted that, this radiation measurement alarm system is characterized by being able to conduct the following. Master machine 1 recognizes the locations and numbers of plural slave machines 2 located within a specified area, and also recognizes the person possessing slave machine 2 by ID recognizing means 46. Master machine 1 specifies the location of slave machines 2, from the direction and distance of slave machines 2 based on the location of master machine 1, by using the direction specifying means and the distance measuring means. These direction specifying means and distance measuring means receive the radio wave by switching over between non-directional receiving antenna 8a and directional receiving antenna 8b with antenna switching part 9. Master machine 1 transmits signals such as commands or the like to slave machine 2, or receives the response signal from slave machine 2. In emergency, slave machine 2 transmits an emergency radio wave.

Figure 7:
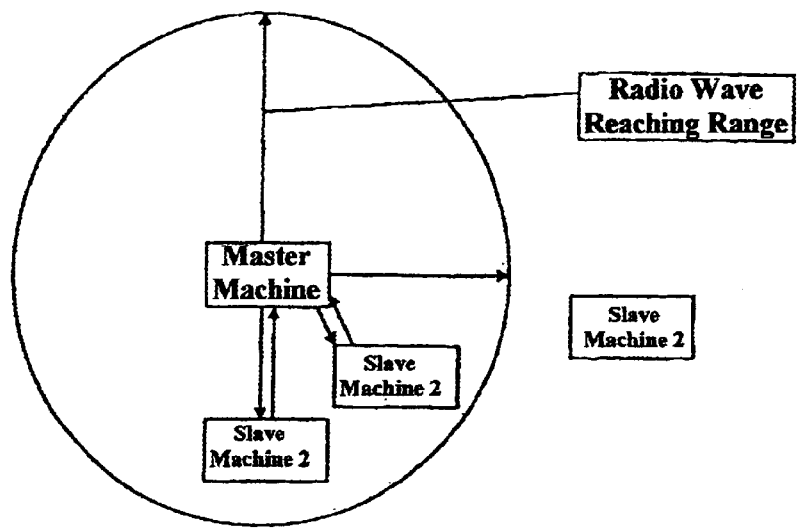
FIG. 7 is an explanatory diagram showing the principle of individual wireless communication with pluralities of slave machines placed within a prescribed range area, in the radiation measurement alarm system according to the present invention.

Furthermore, master machine 1 according to the present invention has variable gain amplifier part 7 that vaires the transmission output, easily changing the range that the radio wave can reach. Therefore, master machine 1 can decide a specified range that the radio wave can reach, as shown in FIG. 7, and broadcast the radio wave from non-directional receiving antenna 8a, and have the scattered slave machines start the radiation measuring activity. Each of slave machines 2 can have a responding time interval defined beforehand according to their ID, and can communicate with master machine 1 at the previously defined time interval succeeding the broadcast. In this way, radiation measurement signal data of a specific slave machine can be received faster than the polling method, and the danger degree of the radiation decided in real time, and alarms transmitted to slave machines 2 according to the decision result.

A method for searching the location of a specific slave machine 2 will be described next. First of all, transmission is conducted to find the location of slave machine 2, using the non-directional receiving antenna 8a. In this case, the transmission output is increased gradually, and when there is a response from a slave machine, the distance to the slave machine is acquired from a table defining the range that this output can reach (operation 1). After that, the transmitting antenna is switched over to single directional receiving antenna 8b by antenna switching part 9, and the direction with the highest receiving level is specified as the direction of the slave machine (operation 2). The intersection of the distance defined in operation 1, and the direction defined in operation 2, should be the location of the person possessing slave machine 2.

Figure 8:
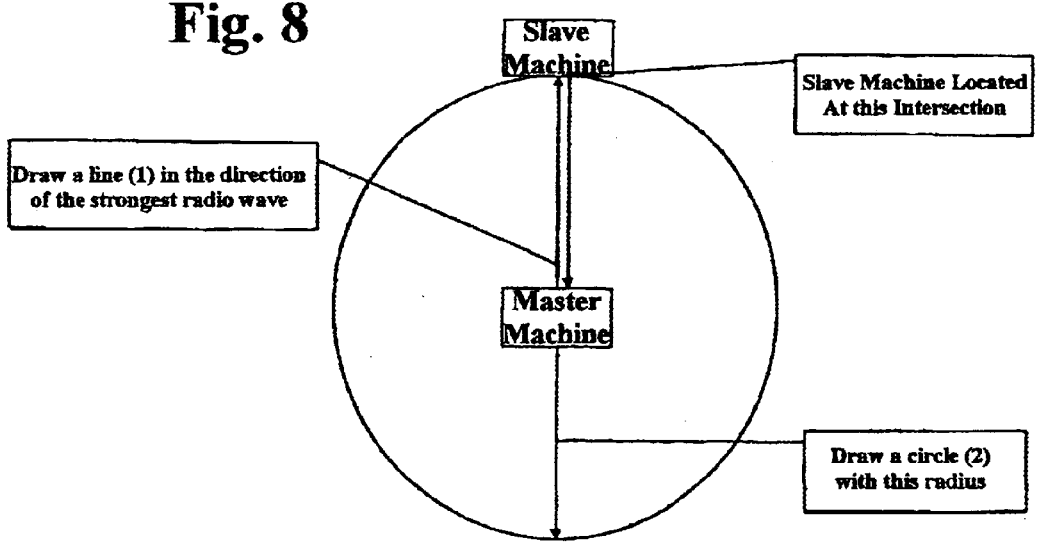
FIG. 8 is an explanatory diagram showing the principle of how a location of a particular slave machine is found out by a single master machine, in the radiation measurement alarm system according to the present invention.

The principle of the above-mentioned method to search for the location of slave machine 2 is shown in FIG. 8. That is, a circle is drawn on the map on which master machine 1 exists, with the present location of master machine 1 as its center. The distance defined in operation 1 is the circle's radius, and a straight line is drawn in the direction defined in operation 2. Then, it is understood that the absent slave machine being searched for is located at the place indicated by the intersection of both of the drawn lines.

Furthermore, when slave machine 2 is in a state of emergency, such as when the possessor of slave machine 2 has met an accident, or the possessor of slave machine 2 became unable to move, slave machine 2 can be made to transmit an emergency radio wave continuously, when emergency transmitting switch 34 of slave machine 2 is pushed. In this way, it is also possible to make it easier for master machine 1 or the rescue squad to find slave machine 2.

INDUSTRIAL APPLICABILITY

This invention combines one master machine and plural slave machines, each with an ID added on, enabling wireless communication with each other. To be specific, slave machines 2 are distributed among the multitudes of inhabitants living in the vicinity of a nuclear energy utilization facility "A", and each of the inhabitants either carries it with them, install it on the automobile they use, or install it on a place in close touch with their livelihood, such as buildings. When there is a radiation leak from the nuclear energy utilization facility "A" caused by an unexpected accident, and the sensor of multitudes of slave machines 2 carried or mounted by the inhabitants in the vicinity detect the radiation, the signal is immediately transformed into electric measurement signal data, and the measurement signal data is immediately transmitted to the master machine from the slave machine transmitting apparatus. When the slave machine transmits the measurement signal data to the master machine with high frequency wireless communication in such a way, the measurement signal data received from the slave machine is stored in the database means for the time being, without omission. Then, the measurement signal data is immediately taken out of this database means, and true radiation measurement data is extracted from the measurement signal data by discriminating noise. Then, this true radiation measurement data is compared to previously prescribed safety standard data, and the danger degree is determined, and an alarm signal is transmitted in real time to the slave machine according to the determining result. Then, slave machine 2 displays an alarm such as a danger alarm or a safety notice with alarm apparatus 24, on receiving an alarm signal from master machine 1. With this alarm display, the inhabitant carrying the slave machine can perceive, in real time, that a radiation leak accident has occurred, that he or she has been exposed to the radiation, an understand of the degree of danger to which he or she is exposed to as a result of the radiation, and so on. As a result, the inhabitants are able to take quick appropriate countermeasures, such as getting immediate medical treatment, evacuating immediately, or to standby.

Moreover, in system of the present invention, the master machine can recognize and specify the locations and numbers of plural slave machines located within a prescribed area. The master machine can also recognize the persons possessing the slave machines, using the ID recognizing means. The master machine can specify the location of the slave machine, from the direction and distance of the slave machine based on the location of master machine, by using the direction specifying means and the distance measuring means. This direction specifying means and distance measuring means receive the radio wave by switching over between the non-directional receiving antenna and the directional receiving antenna. The master machine is constituted, so that it can transmit signals such as commands or the like to the slave machine, or receive the response signal from the slave machine. The slave machine is constituted so that, in emergency, the slave machine can transmit an emergency radio wave. Hence, it is possible to conform to various circumstances. In this way, the radiation measurement alarm system can correspond to various situations, and is easy to use.

Therefore, the master machine can act as a central control center for countermeasures against the radiation leak, and can take charge of complicated, important, and high standard management tasks, such as data collection, noise discrimination, analysis, danger degree decision, individual alarming, and so on. On the other hand, the slave machine is made compact and easy to carry, and only takes charge of the radiation detecting function, the alarm function, and the communication function with the master machine. In other words, the radiation measurement alarm system according to the present invention is characterized, in making compatible the mobility, and the overcoming of technical difficulty, by combining the slave machine and the master machine. Moreover, a second characteristic of the present invention is that it gives the inhabitants, who are the concerned victims, a radiation detecting role, and makes them participate and become embedded as a part of the radiation measurement or the alarm system. In particular, the radiation measurement alarm system of this invention becomes a social system high in reliability and effectiveness, making the system a disclosure of information type with citizen participation.

In this way, by having the inhabitants in the vicinity of the nuclear energy utilization facility, who are the victims, possess the slave machine that detects and measures the radiation leak, which is generally difficult to recognize even when an accident has occurred, this system becomes a system in which all of the inhabitants monitor, measure, and issue alarms continuously. As a result, it is established in effect, that it is safe unless this measurement alarm system is activated, and anxiety caused by distrust is removed. Even in the unlikely event of an accident happening, the system is able to activate in real time, notifying accurately and effectively the inhabitants in the vicinity who becomes the direct victims. Hence, the damage from the radiation exposure is kept to a minimum.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A radiation measurement alarm system comprising:
   a master machine;
   a plurality of slave machines;
   a radiation detecting means in each of said plurality of slave machines for detecting radiation;
   a slave machine transmitting apparatus for transmitting data from said slave machine to said master machine;
   a slave machine receiving apparatus for receiving signals from said master machine;
   an alarm apparatus in each of said plurality of slave machines for at least one of sending and receiving emergency data;
   an alarm display part in each of said plurality of slave machines for notifying a user of said slave machine of radiation exposure with at least one of sound and illumination;
   a slave machine control part for controlling each of said plurality of slave machines, wherein, when radiation is detected by said radiation detecting means, said slave machine transforms a detected radiation signal into electric measurement signal data and transmits said measurement signal data from said slave machine transmitting apparatus;
   a master machine transmitting apparatus for sending information from said master machine to at least one of said plurality of slave machines;
   a master machine receiving apparatus for receiving signals from said plurality of slave machines;
   a data processing part in said master machine, for at least one of receiving, storing, retrieving and analyzing data received from said master machine receiving apparatus;
   a master machine control part for controlling said master machine; and
   output means part for outputting contents of processing in said data processing part and said master control part.

2. The radiation measurement alarm system according to claim 1, wherein said radiation detecting means comprises:
   a sensor for detecting radiation and transforming a detection signal into an electric measurement signal; and
   a preamplifier for amplifying said electric measurement signal from said sensor.

3. The radiation measurement alarm system according to claim 1, wherein said slave machine transmitting apparatus comprises:
   a slave machine transmitting part for transmitting high frequency wave with a surface wave transmitter and a transistor;
   a slave machine modulating part for modulating measured signal data into said high frequency wave; and
   a transmission pattern antenna part.

4. The radiation measurement alarm system according to claim 1, wherein said slave machine receiving apparatus comprises:
   a reception pattern antenna part;
   a reception high frequency preamplifier part; and
   a slave machine demodulating part for demodulating high frequency wave signals into reception data.

5. The radiation measurement alarm system according to claim 1, wherein said alarm apparatus comprises an emergency transmitting switch for transmitting an emergency radio wave whenever said emergency transmitting switch is pushed.

6. The radiation measurement alarm system according to claim 1, wherein said slave machine control part comprises:
   a command interpretation means for interpreting a command sent from said master machine;
   a command responding means corresponding to said command,
   an ID management means; and
   a time management means.

7. The radiation measurement alarm system according to claim 1, wherein said master machine transmitting apparatus comprises:
   a transmitting part for transmitting high frequency wave with a surface wave transmitter and a transistor;
   a modulating part for modulating sending data to said high frequency wave;
   a variable gain amplifier part for controlling an output of a radio wave outputted from a transmission antenna of said master machine; and
   a transmission antenna part.

8. The radiation measurement alarm system according to claim 1, wherein said master machine receiving apparatus comprises:
   a non-directional receiving antenna;
   a directional receiving antenna;
   an antenna switching part for switching between said non-directional receiving antenna and said directional receiving antenna;
   a reception preamplifier part; and
   a demodulating part for demodulating high frequency wave signal into reception data.

9. The radiation measurement alarm system according to claim 1, wherein said data processing part comprises:

data receiving means for receiving measured signal data, sent from said slave machine with said master machine receiving apparatus, and registering and storing said measured signal data;

a noise discrimination apparatus for taking out said measurement signal data from said data receiving means, analyzing said measurement signal data to distinguish and remove noise signals in order to extract and transform into true radiation measurement data, and storing said true radiation measurement data;

danger degree determination means for comparing said true radiation measurement data with previously prescribed safety standard data to determine the danger degree and instructing countermeasures; and alarm signal transmitting means for transmitting an alarm signal transmitted from said master machine to said slave machine.

10. The radiation measurement alarm system according to claim 1, wherein said master machine control part comprises:

gain control means enabling a gain control of a variable gain amplifier part;

distance measuring means for specifying a range by measuring distance a radio wave can reach and enabling measurement of said distance with said gain control means;

direction specifying means for specifying a direction of a radio wave with a directional receiving antenna;

reserved time configuration means configuring a reserved time from said master machine to said slave machine control part of said slave machine;

command transmitting means enabling a transmission of commands as data;

response signal receiving means for receiving response signals from said slave machines corresponding to transmission from said master machine; and ID recognizing means for specifying said slave machine transmitting a response signal by recognizing an ID added beforehand to said signal.

11. The radiation measurement alarm system according to claim 1, wherein said output means outputs data including at least one of a range and distance a radio wave can reach, a specified direction that said radio wave is to reach, results of identification of said slave machines, a true radiation measurement data extracted from said measurement signal data, the determined result of a degree of danger of said true radiation measurement data, and the contents of alarms sent to said slave machine.

12. The radiation measurement alarm system according to claim 1, wherein:

said master machine specifies and ascertains a number of said slave machines within a specified range area;

said master machine identifies said number of said slave machines from an ID by having a variable gain amplifier part of said master machine transmitting apparatus able to control and vary an output of a radio wave outputted from a transmission antenna part, by having a range of said radio wave can reach processed and specified by a gain control of said variable gain amplifier, by having said master machine transmit a call-out signal to said slave machines within said specified range area, by having said master machine receive signals from said slave machines receiving said call-out signal from said master machine.

13. The radiation measurement alarm system according to claim 1, wherein said master machine checks a location of a person possessing said slave machine by:

having a reception antenna part of said master machine receiving apparatus provided with both a non-directional receiving antenna and a directional receiving antenna;

having an antenna switching part of said master machine receiving apparatus switching between said non-directional receiving antenna and said directional receiving antenna, making the direction of radio waves being limited to a specified direction;

having a transmission distance measured using said non-directional receiving antenna; and having said non-directional receiving antenna switched to said directional receiving antenna to determine direction.

14. The radiation measurement alarm system according to claims 1, wherein said radiation measurement alarm system has relaying means fore relaying radio waves between said master machine and said plurality of slave machines.

* * * * *